United States Patent [19]
Nieling et al.

[11] Patent Number: 5,700,191
[45] Date of Patent: Dec. 23, 1997

[54] OPERATING PANEL FOR A MOTOR VEHICLE AIR-CONDITIONING SYSTEM

[75] Inventors: Andreas Nieling, Asperg; Wolfgang Frank, Ditzingen; Holger Kissel, Griesheim; Reinhard Koehler, Riedstadt; Werner Mueller, Otzberg, all of Germany

[73] Assignee: Behr GmbH & Co., Stuttgart, Germany

[21] Appl. No.: 631,194

[22] Filed: Apr. 12, 1996

[30] Foreign Application Priority Data

Apr. 13, 1995 [DE] Germany .............. 195 13 478.8

[51] Int. Cl.$^6$ .................................................. B60H 1/32
[52] U.S. Cl. ..................................... 454/69; 165/24
[58] Field of Search ........................ 454/69, 156; 62/163; 165/24, 43; 236/1 C

[56] References Cited

U.S. PATENT DOCUMENTS

| | | | |
|---|---|---|---|
| 4,250,956 | 2/1981 | Ohtani | 165/36 |
| 4,326,667 | 4/1982 | Murata et al. | 237/12.3 |
| 4,352,452 | 10/1982 | Shimada et al. | 165/24 X |
| 4,355,752 | 10/1982 | Antoine | 454/69 X |
| 4,362,268 | 12/1982 | Shimada et al. | 165/43 X |
| 4,442,885 | 4/1984 | Matsuzaki | 62/163 X |
| 5,452,587 | 9/1995 | Honda et al. | 62/244 |

FOREIGN PATENT DOCUMENTS

| | | | |
|---|---|---|---|
| 24 08 838 | 9/1975 | Germany | 454/69 |
| 3 049 125 | 9/1981 | Germany . | |
| 3 107 722 | 9/1982 | Germany . | |
| 3 409 321 | 9/1985 | Germany . | |
| 4 425 697 | 1/1995 | Germany . | |

OTHER PUBLICATIONS

Grohmann et al., "The Automatic Heat and Air Conditioner from the New 7' Series BMW", ATZ Automobil-technische Zeitschrift 90, Issue 3, pp. 2-7, (1988).

*Primary Examiner*—Harold Joyce
*Attorney, Agent, or Firm*—Foley & Lardner

[57] ABSTRACT

An operating panel for an air-conditioning system equipped with a heating device and a cooling unit comprises a plurality of actuating elements for setting the rotational speed of a blower, the incoming-air temperature, the air distribution, and the fresh-air/circulating-air damper. A switch arranged in the operating panel serves to switch the cooling unit on and off. A maximum cooling switch sets the air temperature to maximum cooling in the vehicle passenger compartment by coupling the maximum cooling switch to the fresh-air/circulating-air damper, on a blower step switch, which controls the blower motor, and the cooling unit switch. Thus, a single switch conveniently and automatically sets to the maximum cooling setting.

6 Claims, 6 Drawing Sheets

OPERATING PANEL FOR A MOTOR VEHICLE AIR-CONDITIONING SYSTEM

BACKGROUND OF THE INVENTION

The invention relates to an operating panel for an air-conditioning system of a motor vehicle, the air-conditioning system being equipped with a heating device and a cooling unit.

An operating panel for a heating and air-conditioning system of a motor vehicle is described in German patent publication DE 31 07 722 A1. This operating panel comprises a plurality of operating elements and power-assisted actuating members as well as two independent circuits. One circuit forms a temperature-selection closed-loop control circuit and the other circuit forms a program-selection circuit. The temperature-selection closed-loop control circuit comprises, inter alia, a temperature-selection switch, a passenger-compartment temperature sensor, and a power-assisted temperature-damper adjuster. The program-selection circuit comprises power-assisted actuating members for an air-distributor damper and a circulating-air damper. It also comprises a program-selection part by means of which the actuating members, the blower, and the compressor of the cooling unit are switched. The program-selection part has a push-button arrangement with a plurality of alternatively lockable push buttons provided with symbols for specific climatic conditions. Each of the push buttons activates a program that, in accordance with predetermined conditions, acts on the various actuating members for the air dampers, the blower and the compressor.

The known operating panel is laid out clearly and is simple to operate. All that has to be done to operate it is to set the temperature-selection switch to the temperature desired by the vehicle occupant and to press one of the buttons contained in the program-selection part. While this leads to a predetermined setting of all the dampers and units, however, it is not possible to obtain heating or ventilation desired specifically by the driver or passenger. In particular, air distribution or a blower speed desired by the vehicle occupant cannot be set. Moreover, it is not possible, in the case of the known arrangement, to operate the air-conditioning system in the so-called reheating mode since, when the temperature-mixing damper is open, the cooling unit is switched off. The fixed programs do not permit a different mode of operation. Further, although the operation may be simple, it is obtained at the expense of the control sophistication of the system.

The article by Grohmann, Kess, Egle, *Klimaautomatik der neuen 7er Baureihe von BMW*—translated *Automatic air conditioning in the new BMW7Series*—in ATZ Automobiltechnische Zeitschrift 90 (1988), Issue 3, describes an actuating unit for the automatic air conditioning. This actuating unit comprises a plurality of push buttons, by means of which specific settings of the functions of the air-conditioning system can be selected. By virtue of the signals set by the setting of the push buttons to an electronic control unit, the electronic control unit fully automatically takes over the setting of the heating and air-conditioning system, which setting is separate for the driver and the passenger. In this arrangement, the rotational speed of the blower motor is controlled in accordance with the air quantity set by the selection dial, and a plurality of stepping motors actuate air dampers and valves. An essential advantage of such electronic control units consists in the fact that logic operations for setting defined operating modes, for example windshield defrosting or the like, can be realized without difficulty. The known system provides good climatic conditions, but the outlay required for this is considerable and complicated, let alone the multiplicity of stepping motors and electronic control means.

Moreover, German patent publication DE 34 09 321 A1 discloses an air-conditioning system with a control device for controlling the climatic conditions in the passenger compartment, where the best possible climatic conditions are achieved in accordance with fixed predetermined control characteristics, depending on currently prevailing environmental parameters. In order to fulfil the specific comfort requirements of the user, the operating panel comprises input buttons by means of which the user can vary the stored programs within certain limits. On account of the multitude of operating elements, correct operation of the known operating panel is difficult and, moreover, such an air-conditioning system involves a similar amount of outlay and cost as in the case of the automatic air conditioning described in the abovementioned article in ATZ.

SUMMARY OF THE INVENTION

Accordingly, the object of the invention is to provide an operating panel of the generic type, where specific comfort settings can be carried out with the aid of mechanical actuating elements, and the air-conditioning system can be set to maximum cooling of the air in the vehicle passenger compartment in a simple and reliable manner.

According to the present invention, the operating panel for a motor vehicle air-conditioning system operates a heating device and a cooling unit. The cooling unit generally has a switch for switching the cooling unit on and off. The heating and cooling units also have an associated air blower with a speed control device for setting the blower speed. The cooling and heating units further have an associated fresh air circulating damper with a damper movement controller for moving the damper between a fresh air position and an air circulating position.

The present operating panel has a blower speed actuating element connected to the speed control device for selectively setting the blower speed. It also has an air temperature actuating element for selectively setting the incoming-air temperature and an air distribution actuating element for selectively setting air distribution in a vehicle passenger compartment. The panel further includes a circulation damper actuating element for selectively actuating the fresh air circulating damper. It further includes a maximum air cooling actuating element for maximum air cooling of the air in a vehicle passenger compartment. A coupler is connected to the maximum air cooling actuating element and to the damper movement controller, to the blower speed control device, and to the cooling unit switch so that actuation of the maximum air cooling actuating element sets damper to the air circulating position, the blower to a predetermined speed, and the cooling unit to a maximum output. Thus, only a single actuation of the maximum cooling element automatically and conveniently sets all the necessary setting to achieve maximum cooling.

According to one aspect of the invention, the coupler comprises at least one electric switch actuated by the maximum air cooling actuating element and electric connecting lines to the blower speed control device and the damper controller. The electric switch is provided with a contact for switching the cooling unit switch on and off. The damper controller can be an electromechanical actuating member, where the electric switch is provided with a contact for switching the electromechanical actuating member for mov-]

ing the damper to the air circulating position. The electric switch is also provided with a contact for switching the blower speed control device.

According to another aspect of the invention, the coupler includes at least one mechanical transmission element connected to the maximum air cooling actuating element and to the blower speed control device and at least one mechanical transmission element connected to the maximum air cooling actuating element and to the damper. These mechanical transmission elements each preferably comprise a linkage or a cable pull.

According to yet another aspect of the invention, the coupler includes pneumatic or hydraulic actuators and working cylinders and the maximum air cooling actuating element is a signal generator for controlling the working cylinders, which are connected to the blower speed control device and the damper.

The maximum air cooling actuating element can be a discrete switch or part of the air temperature actuating element, which controls the maximum air cooling actuating element. In the second instance, the air temperature actuating element is rotatable between two extreme temperature setting positions and the maximum air cooling actuating element is activated by rotating to one of the two extreme temperature positions, namely to the coolest temperature position.

A second coupler can be connected to the maximum air cooling actuating element and the air distribution actuating element to control the air distribution. For example, first and second rods can be connected to a lever, with the first rod connected to the air distribution actuating element and the second rod to the maximum air cooling actuating element.

BRIEF DESCRIPTION OF THE DRAWINGS

These and other features, aspects, and advantages of the present invention will become much more apparent from the following description, appended claims, and accompanying exemplary embodiments of the invention shown in the following drawings:

DETAILED DESCRIPTION OF THE PREFERRED EMBODIMENTS

Figure 1:
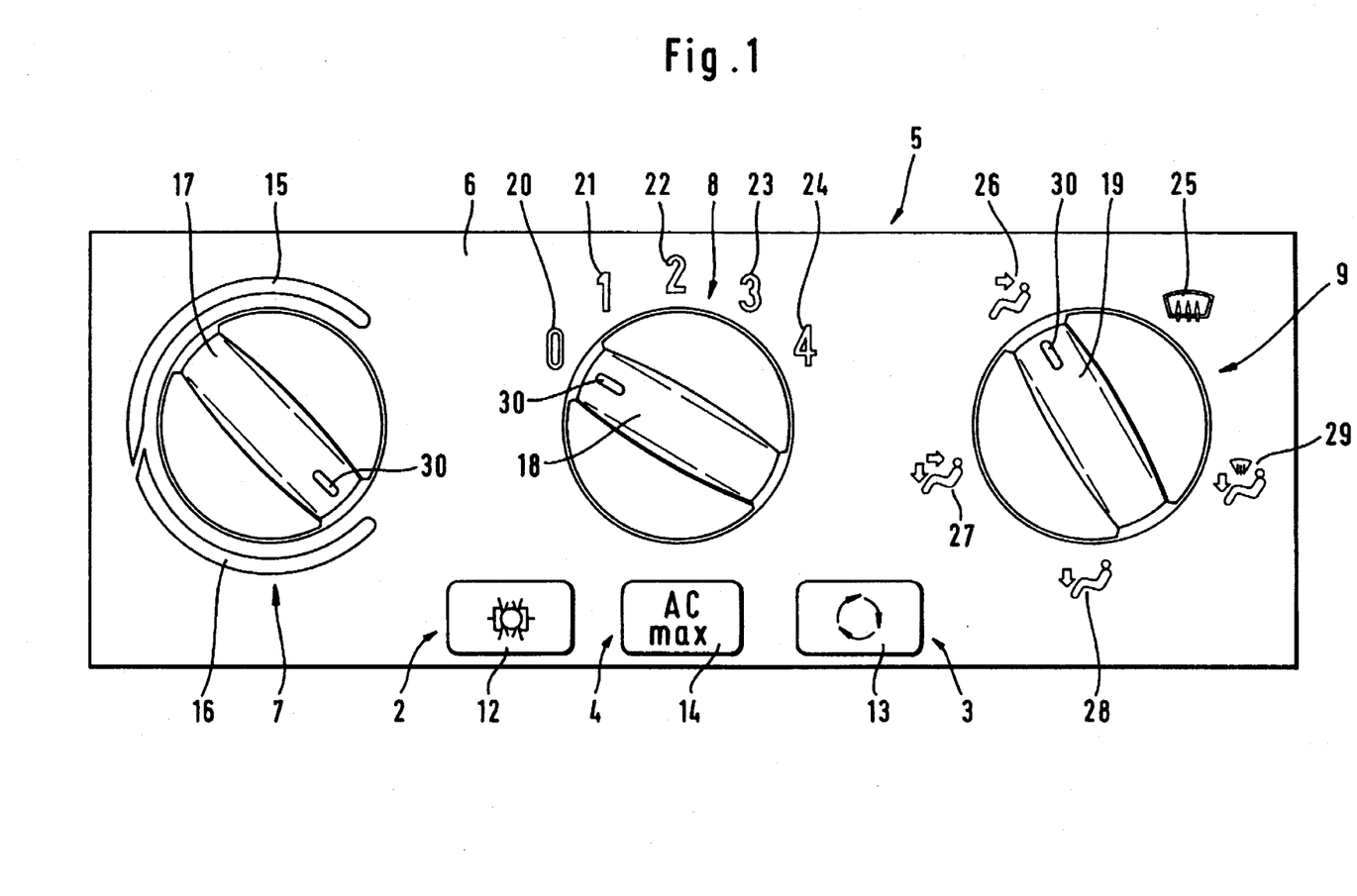
FIG. 1 shows the front view of an operating panel with an actuating element for maximum cooling according to the present invention.

FIG. 1 shows the front view of an operating panel 5 having a front plate 6 with three control or actuating elements 7, 8, 9 designed as turning knobs 17, 18, 19, and with three actuating elements 2, 3, 4 designed as push-button switches 12, 13, 14. The actuating element 7 serves for setting the incoming-air temperature for the passenger compartment of the vehicle. The turning knob 17 is surrounded by two symbols 15 and 16 designed as ring segments on the front plate 6. The symbol 15 indicates the warm-air range and the symbol 16 indicates the fresh-air or cold-air range.

Each of the ranges extends over half of the total rotatable angle of approximately 270° of the two ring segments. This total angle corresponds to the maximum possible angle of rotation of the turning knob 17. The actuating element 7 is in operative connection with a temperature-mixing damper or with a water valve of the heating element of the heating device.

The actuating element 8 serves for setting the rotational speed of a blower, the turning knob 18 preferably being coupled to a blower step switch. In accordance with the representation in FIG. 1, four rotational-speed stages of the blower and one off position are provided, as shown by the symbols 20, 21, 22, 23, 24 arranged on the front plate 6.

The actuating element 9 serves for setting the air distribution. For this purpose, the turning knob 19 can be rotated over the entire circle circumference and can be set in five main positions, preferably located at uniform angular spacings, and, if appropriate, in any desired intermediate positions. The main positions are defined by corresponding symbols 25, 26, 27, 28, 29, the meanings of the symbols being as follows:

symbol 25=windshield defrosting symbol 26=air outlet through central nozzles, symbol 27=air outlet through central nozzles and footwell nozzles, symbol 28=air outlet through footwell nozzles, and symbol 29=air outlet through footwell nozzles and windshield defrosting.

On their grips, the turning knobs 17, 18, 19 each have a marking 30 that clearly indicates the respective position of the relevant turning knob 17, 18, 19. The symbols 15 and 16 and 20 to 29, and the markings 30 preferably consist of a translucent material, so that illumination of the symbols is possible.

The push-button switches 12, 13, 14 are located in the bottom region of the front plate 6, the push-button switch 12 serving as actuating element 2 for switching the cooling unit on and off. This push-button switch 12 neither acts on the actuating elements 7, 8 and 9, nor on the dampers assigned to the actuating elements 7, 8 and 9 for the temperature, the blower step switch, and the air distribution settings, respectively.

The push-button switch 13 can activate an actuating member for actuating a fresh-air/circulating-air damper, with the result that the circulating-air position or the fresh-air position can be selected as required by the vehicle occupant. The push-button switch 14 is provided as actuating element 4 for maximum cooling (AC max) of the air in the vehicle passenger compartment. If maximum cooling of the air in the vehicle passenger compartment of the vehicle is desired by an occupant, all that is required is an actuation of this one push-button switch 14, which actuation carries out all the necessary settings of the cooling unit, including the dampers and the blower. To set the corresponding dampers and unit functions, provision is made for coupling the push-button switch 14 to the fresh-air/circulating-air damper, to the blower speed-control device, and to the cooling unit switch 12. Likewise, the heating device is switched off by closing the water valve or moving the temperature-mixing damper into the cold-air position. These means may be formed, for example, by electric contacts on the push-button switch and by corresponding connecting lines to actuating members or switches of the elements to be activated.

Figure 2:
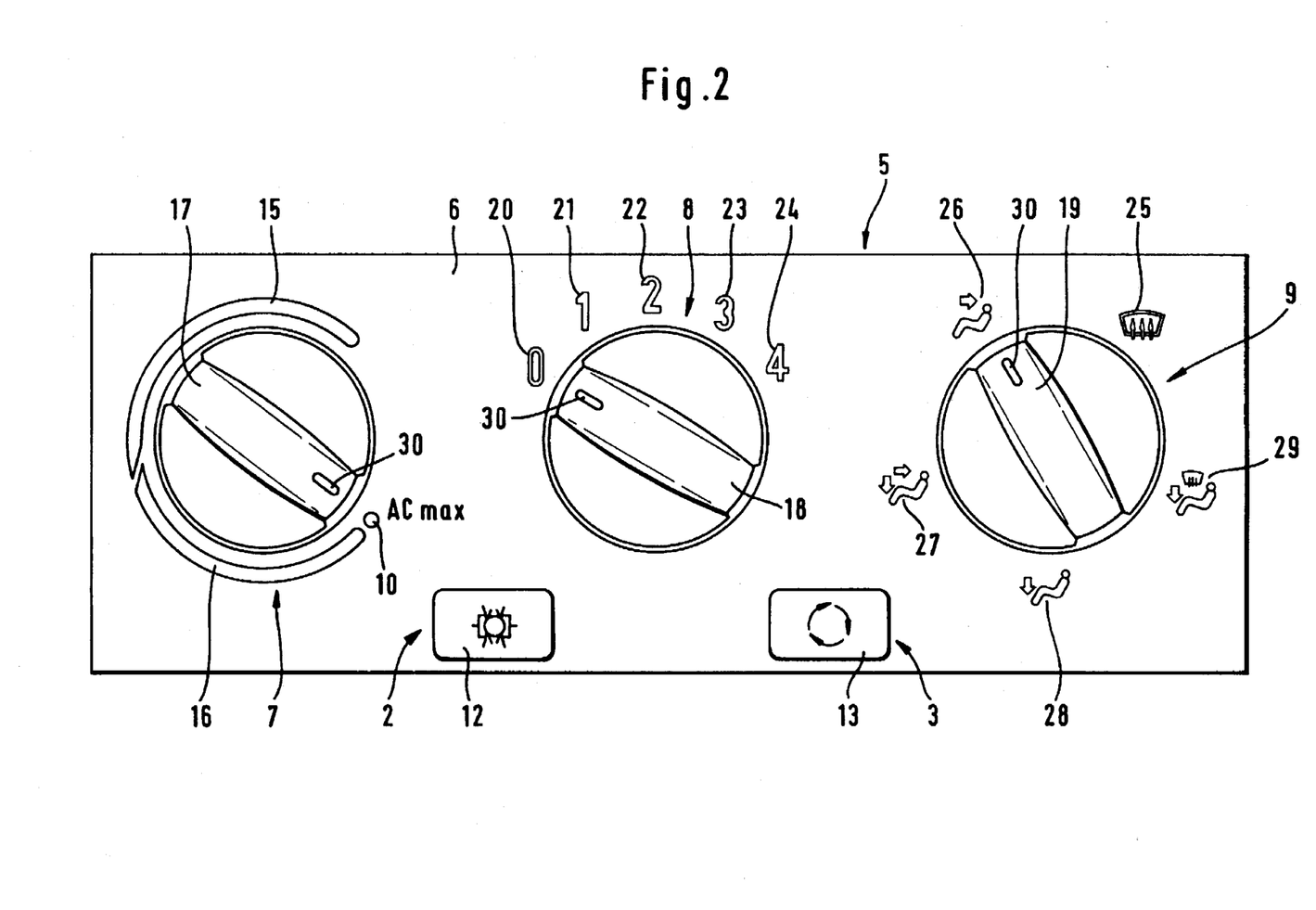
FIG. 2 shows another embodiment similar to FIG. 1.

FIG. 2 shows the front view of an operating panel 5, which essentially corresponds with that of FIG. 1. For this reason, the references for the same parts also correspond with those of FIG. 1. Instead of a separate push-button switch, the actuating element 7 operates the maximum cooling setting (simultaneously permits the setting of maximum cooling (AC max)). For this purpose, an additional position of the turning knob 17 is provided after the end of the symbol 16, this additional position being indicated by a corresponding symbol 10 bearing the designation "AC max". In the embodiment shown in FIG. 2, a switch with electric contacts and connecting lines to the respective actuating members and/or units may likewise be provided for coupling the actuating element 7, in the position identified by the symbol 10, to the fresh-air/circulating-air damper, to the speed-control device, and to the cooling unit. But depending on the design of the actuating elements, a mechanical coupling is also possible, and this can be formed by linkages and/or cable pulls and/or pneumatic or hydraulic components. The advantage of this arrangement over the embodiment shown in FIG. 1 is that there is no need for any means for switching the heating device off since the heating device does not operate anyway in the cooling end region of the symbol 16.

Figure 3A:
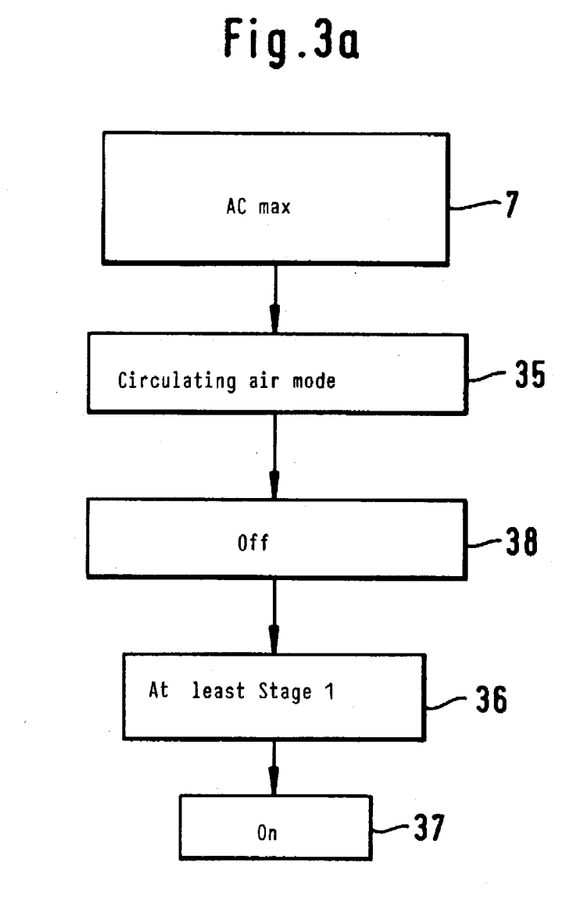
FIG. 3a shows an operational diagram for the embodiment of FIG. 2 in the event of switching on to maximum cooling.

FIG. 3a represents an operational diagram corresponding to the switch-on state of the actuating element 7. If the actuating element 7, with the aid of the turning knob 17, is set to maximum cooling (AC max) of the air in the vehicle passenger compartment, then the circulating-air damper 35 is moved into the "circulating-air mode" position, provided it is not already located in this position as a result of prior setting. In any case, the heating 38 is switched off. Thereafter, the blower step switch 36 is first set to a position corresponding at least to blower stage 1 (symbol 21 of the actuating element 8). If the blower has already been switched on, the blower step switch 36 remains unchanged, unless a higher blower stage than that which has been set is envisaged for "AC max" mode. Furthermore, the cooling unit 37 is switched on.

Figure 3B:
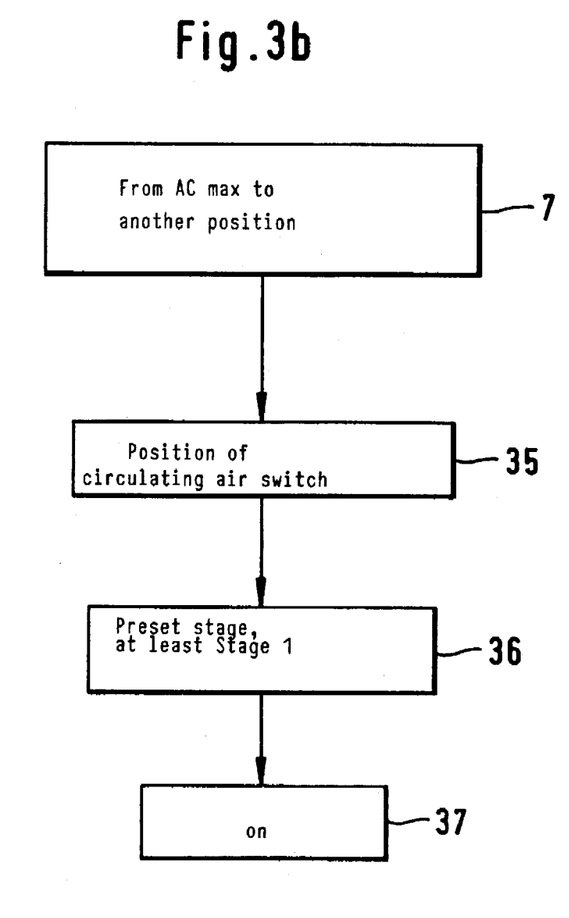
FIG. 3b shows an operational diagram for the embodiment of FIG. 2 in the event of switching the maximum cooling mode off.

FIG. 3b represents an operational diagram that takes effect as soon as the actuating element for maximum cooling of the air in the vehicle passenger compartment of the vehicle is set from the "AC max" position to another position. When the actuating element 7 is thus moved from the "AC max" position into another position, the circulating-air damper 35 is set to the position corresponding to the respective position of the push-button switch 13. The temperature-mixing damper is moved into the position corresponding to the (current) position now predetermined by the actuating element 7. The blower step switch 36 is then set to the position corresponding to the current position of the turning knob 18 of the actuating element 8. The cooling unit 37 remains switched on until, with the aid of the push-button switch 12, the cooling unit is switched off.

It is advantageous to allow the cold air, in "AC max" mode, to flow out into the vehicle passenger compartment from specific nozzles. The central nozzles are preferably provided for this purpose. When the actuating element 4 or 7 is actuated into the "AC max" position, this can also act on the air-distribution means, resulting in the latter being moved into the position according to symbol 26.

Figure 4A:
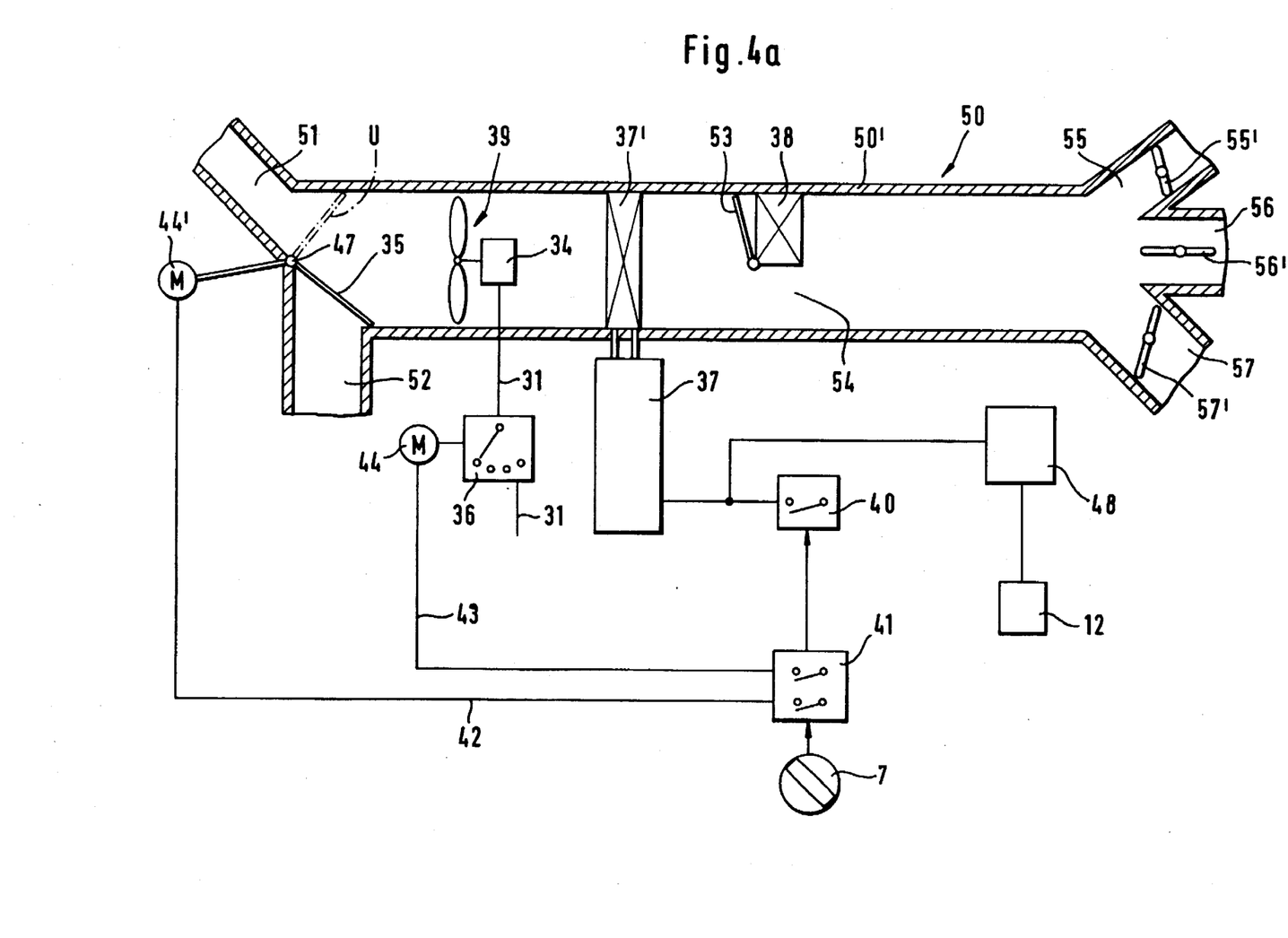
FIGS. 4a–4c are schematically represented air-conditioning systems with various drive and transmission embodiments.

FIG. 4a is a schematic representation of an air-conditioning system 50 whose housing 50' has an airstream flowing through it from left to right, as seen in the drawing. On the inlet side, the housing 50' has a fresh-air duct 51 and a circulating-air duct 52 in the region where a fresh-air/circulating-air damper 35 is arranged such that it can be pivoted about a pivot pin 47. A stepping motor 44' serves to pivot the fresh-air/circulating-air damper 35. As seen in the direction of airflow, a blower 39, which is driven by an electric motor 34, is arranged downstream of the fresh-air/circulating-air damper 35. The blower step switch 36 is arranged in the electric supply line 31 of the electric motor. A stepping motor 44 serves to actuate the blower step switch 36.

In the direction of airflow, an evaporator 37' of the cooling unit 37 is arranged downstream of the blower 39, the evaporator 37' extending over the entire cross section of the housing 50'. The entire airstream thus has to pass through the evaporator 37'. Located downstream of the evaporator 37' is a heat exchanger, which serves as a heating device 38 for heating the airstream as desired. The heating device 38 extends merely over part of the entire cross section in the housing 50'. A bypass duct 54 is thus formed beside the heating device 38. To set the respective airstreams or airstream fractions through the heating device 38 and the bypass duct 54, use is made of a temperature-mixing damper 53, which can be adjusted, preferably steplessly, between the two end positions, 100% cold air and 100% warm air.

The right-hand end of the housing 50' is adjoined by a defroster duct 55, a central nozzle duct 56 and a footwell duct 57. A pivotable damper 55', 56', 57' is arranged in each of these ducts 55, 56, 57. These dampers are actuatable by the actuating elements 9 represented in FIGS. 1 and 2. These dampers 55', 56', 57', as has already been specified with reference to FIGS. 1 and 2, can be set to a plurality of main positions and, if appropriate, further intermediate positions.

The evaporator 37' is a constituent part of the cooling unit, which is designated as a whole by 37. In normal operation, the evaporator 37' is controlled by an AC control means 48, which is activated with the aid of the push-button switch 12 represented in FIGS. 1 and 2.

According to the representation in FIG. 4a, the actuating element 7 is used to actuate the "AC max" position, whereupon a switch 40 is moved into the closed position. This switch 40, independently of the AC control means 48, switches the cooling unit 37 on, so that the latter is operated with maximum output. The corresponding setting of the actuating element 7 to the symbol 10 moreover has the effect of closing the electric contacts in a switch 41. This results in the stepping motors 44 and 44', which are connected to the switch 41 by means of control lines 42 and 43, being activated correspondingly to move the circulating-air damper 35 into the circulating-air position U represented in phantom (by dotted lines) and to move the blower step switch 36 into a specific predetermined output position.

Figure 4B:
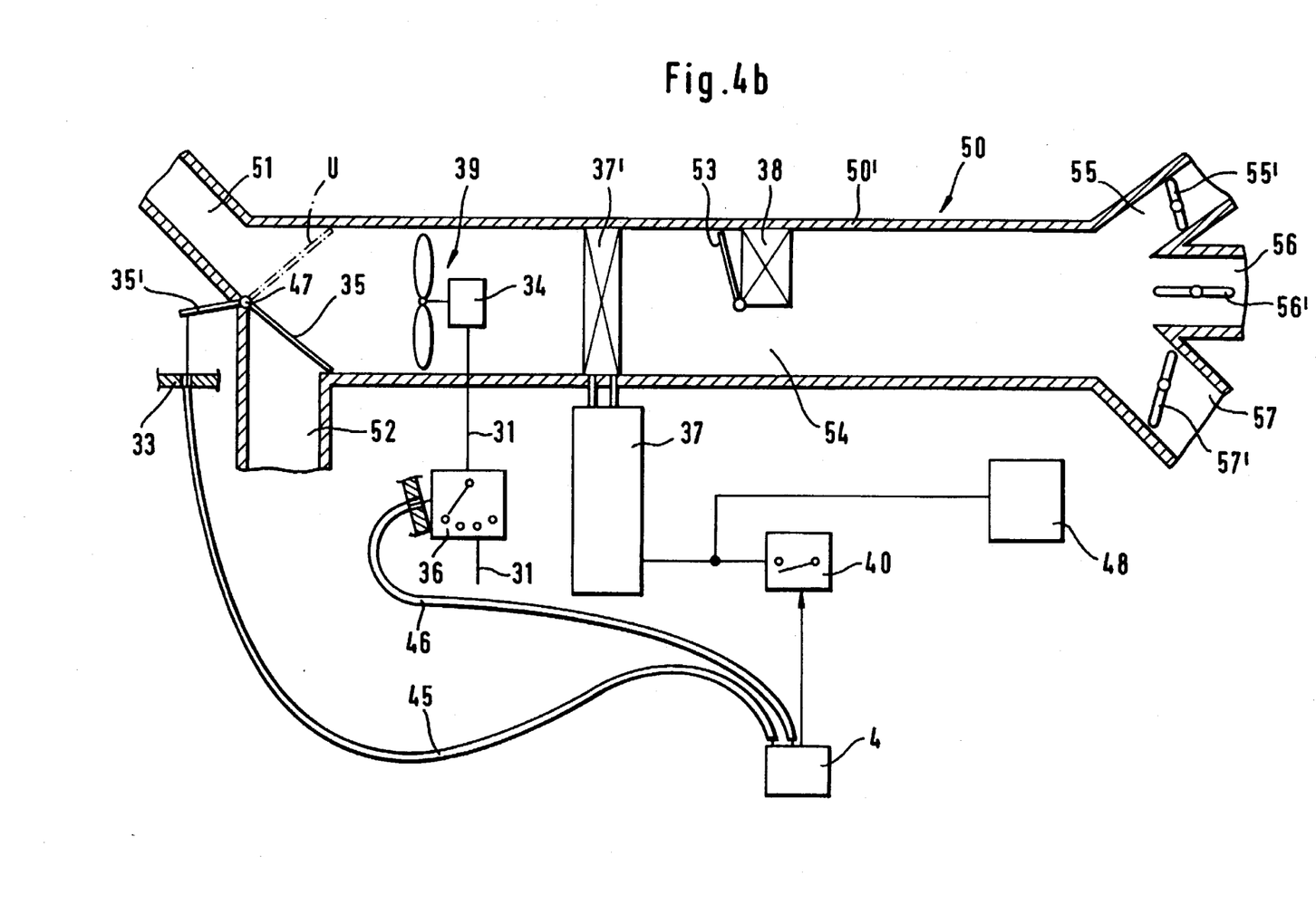

The representation in FIG. 4b corresponds essentially to the air-conditioning system 50 described in FIG. 4a. Thus, only the differences will be discussed hereinbelow. The fresh-air/circulating-air damper 35 is provided with a lever 35' to which the end of a cable pull of a Bowden cable 45 is articulated. The sheath of the Bowden cable 45 is supported on a wall part 33 belonging to the housing 50' and is fixed thereto. The other end of the Bowden cable 45 is connected to the actuating element 4 and is actuated by the same. A second Bowden cable 46 is arranged between the actuating element 4 and the blower step switch 36, this resulting in the actuating element 4 being coupled mechanically to the blower step switch 36. When the actuating element 4 is actuated into the "AC max" position, the contact in the switch 40 is closed, resulting in the cooling unit 37 operating with full output and, at the same time, the fresh-air/circulating-air damper 35 being switched over into the circulating-air position U, and the blower step switch 36 being set to a specific blower stage.

FIG. 4c once again represents the air-conditioning system 50 with the essential components. In the exemplary embodiment of FIG. 4c, the switch 40 is integrated in the AC control means 48. Working cylinders 59 and 60 serve for driving the fresh-air/circulating-air damper 35 and the blower step switch 36. A piston rod 61 of the working cylinder 60 is connected to the lever 35' of the fresh-air/circulating-air damper 35. A piston rod 58 of the working cylinder 59 acts on the blower step switch 36. An operating fluid under pressure acts on the working cylinders 59 and 60. It is possible for the fluid to be a hydraulic fluid or air, for example. The working cylinder 60 is connected to a valve 63 by means of a fluid line 62, a fluid line 66 leading from the valve to a container 49 or reservoir, and a fluid line 65 connecting a pump 64 to the valve 63.

Figure 4C:
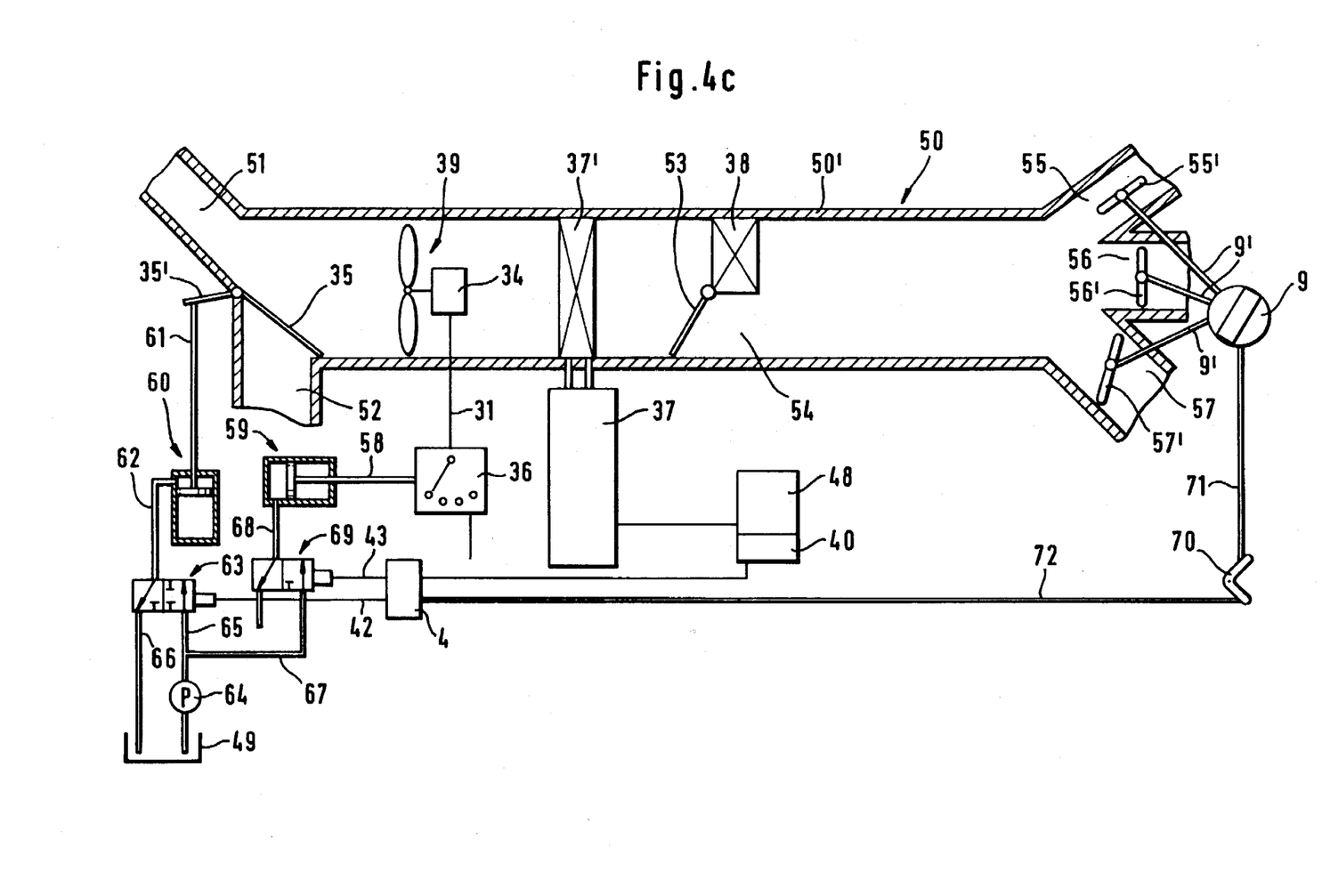

The working cylinder 59 is connected to a valve 69 by means of a fluid line 68, which is arranged between the pump 64 and the valve 69. The valves 63 and 69 are activated via control lines 42 and 43, a corresponding signal being generated by the actuating element 4.

The dampers 55', 56', 57' in the ducts 55, 56, 57 are connected to the actuating element 9 via coupling elements 9'. Actuation of the actuating element 9 thus results in different pivot movements of the dampers 55', 56' and 57'. In order that corresponding setting of the flaps 55', 56' and 57' takes place regardless of the currently set position of the actuating element 9, in the event of the "AC max" mode is switched on by means of the actuating element 4, the actuating element 9 is coupled to the actuating element 4 by means of a transmission linkage. This transmission linkage comprises a first rod 71, a transmission lever 70 and a second rod 72.

Accordingly, the essential advantages of the invention can be seen in that provision can be made in an air-conditioning system for a vehicle, where the operating panel has an electromechanical actuating elements. The present operating panel permits specific comfort settings to be selectively made. It also makes it possible to set for maximum cooling of the air in the vehicle passenger compartment without high-outlay electronic control circuits and a multiplicity of stepping motors. Operation is extremely simple since all that is required is actuation of a single actuating element to set the maximum cooling output. This fully rules out incorrect operation. The specific output stage or speed of the blower may be set so that it rotates at a predetermined speed greater than 0 rpm. Provided that the specific output stage has already been set, it is preferable to maintain this setting.

According to a preferred development of the operating panel, at least one electric contact is provided as coupling means, which contact can be actuated by the actuating element. In this manner, setting the actuating element to maximum cooling generates electric signals or switching states that are supplied to the relevant actuating members or switches for the fresh-air/circulating-air damper, the speed-control device or the cooling unit. Provided that the actuating element for setting maximum cooling has not already moved the temperature-mixing damper or a heating valve into a position corresponding to the "heating off" function, the temperature-mixing damper or the valve is also acted upon correspondingly. Since, in this manner, coupling takes place by means of electric lines, the spatial arrangement of operating panel and air-conditioning system is not important. To switch the cooling unit on, the relevant contact at the contact, which can be actuated by the actuating element, may be arranged parallel to the cooling unit switch provided in the operating panel. Likewise, in the position for maximum cooling, the contact, which can be actuated by the actuating element, can be used to bridge the fresh-air/circulating-air damper switch provided in the operating panel.

Provided that the spatial arrangement of operating panel and air-conditioning system permit it, the coupling means may comprise at least one mechanical transmission element connected, on the one hand, to the actuating element and, on the other hand, to the switch for the blower and/or for the fresh-air/circulating-air damper. Furthermore, provision may be made for mechanical means suitable for actuating the temperature-mixing damper into the "heating off" function. Such a solution is particular expedient when the rotational-speed switch for the blower and/or the air-distributor dampers is/are actuated anyway via the mechanical transmission means. Linkages and/or cable pulls are preferably provided as mechanical transmission means.

The actuating element for maximum cooling may be designed in the form of a separate switch in the operating panel. A further configuration consists in that the actuating element for setting the incoming-air temperature serves simultaneously as a maximum cooling switching element. In this manner, a separate actuating element can be eliminated because the relevant function is taken over by the existing temperature control actuating element. In this case, all that is required is a corresponding identification of the relevant switching position. The actuating element for setting the incoming-air temperature can usually be moved over a specific angle of rotation or a setting path, which, in order to identify the respective temperature level, comprises a red marking for the warm range and a blue marking, for example, for the fresh-air or cold-air range. Other colors may also be provided as desired. It is thus expedient for the switching position for maximum cooling to be provided after the end of the setting range of the actuating element, to be precise after the range that has the blue marking. Moreover, it is advantageous if, in the case of the operating position for maximum cooling, the air flows out of the central nozzles into the passenger compartment of the vehicle. For this purpose, electric or mechanical means are preferably provided for coupling between the actuating element for maximum cooling and the actuating element for air distribution.

Given the disclosure of the present invention, one versed in the art would readily appreciate the fact that there may be other embodiments and modifications well within the scope and spirit of the present invention. Accordingly, all expedient modifications readily attainable by one versed in the art from the present disclosure within the scope and spirit of the present invention are to be included as further embodiments of the present invention. The scope of the present invention accordingly is to be defined as set forth in the appended claims.

We claim:

1. An operating panel for a motor vehicle air-conditioning system, comprising:

a heating device;

a cooling unit with a switch for switching the cooling unit on and off;

an air blower with a speed control device for setting the blower speed;

a damper with a damper movement controller for moving the damper between a fresh air position and an air recirculating position, wherein the damper movement controller is an electromechanical actuating member;

a blower speed actuating element connected to the speed control device for selectively setting the blower speed;

an air temperature actuating element for selectively setting the incoming-air temperature;

an air distribution actuating element for selectively setting air distribution in a vehicle passenger compartment;

a damper actuating element for selectively actuating the damper;

a maximum air cooling actuating element for maximum air cooling of the air in a vehicle passenger compartment; and a coupler connecting the maximum air cooling actuating element to the damper movement controller, to the blower speed control device, and to the cooling unit switch so that actuation of the maximum air cooling actuating element sets the damper to the air recirculating position, the blower to a predetermined speed, and the cooling unit to a maximum output, wherein the coupler comprises at least one electric switch actuated by the maximum air cooling actuating element and electric connecting lines to the blower speed control device and the damper controller, the electric switch being provided with a contact for switching the electromechanical actuating member for moving the damper to the air recirculating position.

2. The operating panel according to claim 1, wherein the electric switch is provided with another contact for switching the cooling unit switch on and off.

3. The operating panel according to claim 1, wherein the electric switch is provided with another contact for switching the blower speed control device.

4. The operating panel according to claim 1, wherein the maximum air cooling actuating element comprises a discrete switch.

5. The operating panel according to claim 1, wherein the air temperature actuating element controls the maximum air cooling actuating element.

6. The operating panel according to claim 5, wherein the air temperature actuating element is rotatable between two extreme temperature setting positions, wherein the maximum air cooling actuating element is activated by rotating to one of the two extreme temperature positions.

* * * * *